United States Patent
Chen

(10) Patent No.: US 12,021,742 B2
(45) Date of Patent: Jun. 25, 2024

(54) MIXING SEGMENTS WITH DIFFERENT SIZES FOR SEGMENT ROUTING

(71) Applicant: HUAWEI TECHNOLOGIES CO., LTD., Shenzhen (CN)

(72) Inventor: Huaimo Chen, Bolton, MA (US)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/967,430

(22) Filed: Oct. 17, 2022

(65) Prior Publication Data
US 2023/0035009 A1    Feb. 2, 2023

Related U.S. Application Data

(63) Continuation of application No. PCT/US2021/019052, filed on Feb. 22, 2021.

(60) Provisional application No. 63/011,118, filed on Apr. 16, 2020.

(51) Int. Cl.
*G06F 15/16* (2006.01)
*H04L 45/00* (2022.01)
*H04L 45/42* (2022.01)
*H04L 45/741* (2022.01)

(52) U.S. Cl.
CPC .......... *H04L 45/42* (2013.01); *H04L 45/566* (2013.01); *H04L 45/741* (2013.01)

(58) Field of Classification Search
CPC . H04L 45/566; H04L 45/741; H04L 12/4633; H04L 45/64; H04L 69/04; H04L 45/34
See application file for complete search history.

(56) References Cited

U.S. PATENT DOCUMENTS

| 2014/0369356 A1 | 12/2014 | Stewart et al. |
| 2021/0092053 A1* | 3/2021 | Filsfils .................. H04L 45/04 |
| 2023/0126801 A1* | 4/2023 | Peng ....................... H04L 45/74 |
| | | 709/238 |

(Continued)

FOREIGN PATENT DOCUMENTS

| CN | 109981457 A | 7/2019 |
| CN | 110557329 A | 12/2019 |

(Continued)

OTHER PUBLICATIONS

Li, Z., et al., "Compressed SRv6 Netowkr Programming," draft-li-spring-compressed-srv6-np-02, Feb. 25, 2020, 28 pages.

(Continued)

*Primary Examiner* — Hieu T Hoang
(74) *Attorney, Agent, or Firm* — Conley Rose, P.C.

(57) ABSTRACT

A method implemented by a first node in a segment routing (SR) network domain includes receiving, from a second node of another network domain, a packet that is to pass through the SR network domain in accordance with segment identifiers (SIDs). The method also includes obtaining compressed SIDs corresponding to some of the SIDs. The method includes generating, by the first node, a segment routing header (SRH) having a list of segments and a segment left (SL) field. The method finally includes adding the SRH to the packet, and forwarding the packet with the SRH to a third node in the SR network domain.

19 Claims, 8 Drawing Sheets

(56) References Cited

U.S. PATENT DOCUMENTS

2023/0145372 A1* 5/2023 Wen .................... H04L 69/04
370/392

FOREIGN PATENT DOCUMENTS

CN 110636001 A 12/2019
EP 3675449 A1 7/2020

OTHER PUBLICATIONS

Weiqiang, C., et al., "Unified Identifier in IPv6 Segment Routing Networks," draft-mirsky-6man-unified-id-sr-06, Mar. 14, 2020, 28 pages.
Li, Z., et al., "Generalized Segment Routing Header," draft-lc-6man-generalized-srh-00, Feb. 11, 2020, 24 pages.
Filsfils, C., Ed., et al., "SRv6 Network Programming," draft-ietf-spring-srv6-network-programming-24, Oct. 7, 2020, 50 pages.
Filsfils, C., Ed., et al., "SRv6 Network Programming," draft-ietf-spring-srv6-network-programming-14, Mar. 16, 2020, 45 pages.
Chen, H., "Generalize SL for Compressed SIDs," draft-chen-spring-gen-sl-4csids-00, Apr. 2020, 14 pages.
Filsfils, C., Ed., et al., "IPv6 Segment Routing Header (SRH)," RFC 8754, Mar. 2020, 27 pages.

* cited by examiner

MIXING SEGMENTS WITH DIFFERENT SIZES FOR SEGMENT ROUTING

CROSS-REFERENCE TO RELATED APPLICATIONS

This patent application is a continuation of International Application No. PCT/US2021/019052 filed on Feb. 22, 2021, by Futurewei Technologies, Inc., and titled "Mixing Segments With Different Sizes for Segment Routing," which claims the benefit of U.S. Provisional Patent Application No. 63/011,118 filed Apr. 16, 2020, by Futurewei Technologies, Inc., and titled "System and Method for Mixing any Size Segments," which is hereby incorporated by reference in its entirety.

TECHNICAL FIELD

In general, this disclosure describes techniques for forwarding a packet in a segment routing network. More specifically, this disclosure ensures that the packet is forwarded with a compact segment routing header.

BACKGROUND

In traditional internet protocol (IP) network routing, IP packets are forwarded based on a routing table built by routing protocols. The route taken by the IP packets is usually the shortest path calculated by the routing protocols. In segment routing, the source chooses a path and encodes it in the packet header as an ordered list of segments. The rest of the network executes the encoded instructions.

In an Internet Protocol version 6 (IPv6) data plane, an ordered list of segments is encoded in a routing extension header; however, new hardware is required. In segment routing version 6 (SRv6), a Segment Routing IPv6 Header (SRH) is added to an original packet as an IPv6 extension header that may cause the original packet to grow indefinitely. The IPv6 extension header increases the size of the packet, resulting in the potential for the packet to exceed packet size limits.

SUMMARY

Disclosed herein are techniques that compress the Segment Routing Internet Protocol version 6 (IPv6) Header by compacting the group of segment identifiers (SIDs) having the common B bits of locator and R bits of function (optionally, arguments) into compressed segment identifiers (cSIDs) that comprise only the unique L bits of the locator (and possibly part of function and arguments). By compressing the group of SIDs in such a way, forwarding an encapsulated packet reduces network bandwidth usage and consequently increases packet transmission rate.

A first aspect relates to a method implemented by a first node in a segment routing (SR) network domain comprising: receiving, by the first node from a second node of another network domain, a packet that is to pass through the SR network domain in accordance with segment identifiers (SIDs), wherein a group of the SIDs have a first number of common consecutive data units; obtaining, by the first node, compressed SIDs (cSIDs) corresponding to the group of the SIDs, wherein each cSID comprises unique consecutive data units of a corresponding SID, and wherein the unique consecutive data units correspond to a second number of data units; generating, by the first node, a segment routing header (SRH) having a list of segments and a segment left (SL) field, wherein the list of segments comprises segments in order, wherein the SL field comprises a value indicating a quantity of the segments represented by the second number of data units, and wherein the segments include the cSIDs and the SIDs that do not belong to the group; adding, by the first node, the SRH to the packet; and forwarding, by the first node, the packet with the SRH to a third node in the SR network domain.

Optionally, in any of the preceding aspects, another implementation of the aspect provides that generating the SRH comprises: in response to determining that a length of the rest of the SIDs is not a multiple of the second number, determining a quantity of data units that when added to the length of the rest of the SIDs, causes a respective sum to be the multiple of the second number; and generating the list of segments by inserting the cSIDs and a first padding having the quantity of data units into a bucket that comprises a plurality of segments, and by inserting each SID in the rest of the SIDs into the list.

Optionally, in any of the preceding aspects, another implementation of the aspect provides that generating the SRH further comprises: determining a quantity of segments in the list of segments; computing the value of the SL field by multiplying the segment quantity with 128 bits and dividing a respective product by the second number; and setting the SL field to comprise the computed value.

Optionally, in any of the preceding aspects, another implementation of the aspect provides that generating the SRH comprises, in response to determining that the bucket comprises an empty space having a length greater than the second number, inserting one or more second paddings into the empty space until the length of the empty space becomes less than the second number.

Optionally, in any of the preceding aspects, another implementation of the aspect provides that the SRH further comprises a flag field with a first sub-field, a tag field with a second sub-field, wherein the first sub-field comprises a value of the first number, and wherein the second sub-field comprises a value of the second number.

Optionally, in any of the preceding aspects, another implementation of the aspect provides that obtaining the cSIDs comprises: generating the SIDs in accordance with an SR policy of the SR network domain; and extracting, for each of the at least some of the SIDs, the unique consecutive data units in a respective SID as a cSID.

Optionally, in any of the preceding aspects, another implementation of the aspect provides receiving the packet comprises receiving the packet with the cSIDs, and wherein obtaining the cSIDs comprises extracting the cSIDs from the packet with the cSIDs.

Optionally, in any of the preceding aspects, another implementation of the aspect provides that the first node is an ingress node or a border node of the SR network domain.

Optionally, in any of the preceding aspects, another implementation of the aspect provides that the SR network domain is a network domain supporting an SR over Internet Protocol version 6 (SRv6) data plane.

Optionally, in any of the preceding aspects, another implementation of the aspect provides that the data unit is one of a byte, nibble, and bit.

A second aspect relates to method implemented by a first node in a segment routing (SR) network domain comprising: receiving, by the first node from a second node of the SR network domain, a packet with an internet protocol (IP) header and a segment routing header (SRH), wherein the packet is passing through the SR network domain in accordance with segment identifiers (SIDs), wherein a group of the SIDs have a first number of common consecutive data units, wherein the IP header includes a destination address (DA) for the packet, wherein the SRH comprises a list of segments and a segment left (SL) field, wherein the list of segments comprises segments in order, wherein the segments include compressed SIDs (cSIDs) that correspond to the group of the SIDs and the SIDs that do not belong to the group, wherein each cSID comprises unique consecutive data units of a corresponding SID, and wherein the unique consecutive data units correspond to a second number of data units; in response to determining that a next segment in the order is a cSID, updating, by the first node, a value of the SL field to indicate the next segment in the order, wherein the updated value of the SL field indicates a quantity of remaining segments in the order that is represented by the second number of data units; updating, by the first node, a portion of the DA in the IP header with the next segment in the order based on the updated SL field of the SRH; and forwarding, by the first node, the packet with the IP header and the SRH to a third node of the SR network domain in accordance with the updated DA.

Optionally, in any of the preceding aspects, another implementation of the aspect provides that the SRH further comprises a flag field, and a tag field, wherein the flag field of the SRH comprises a first sub-field for indicating a number of common consecutive data units in the group of the SIDs, wherein the tag field of the SRH comprises a second sub-field for indicating a number of consecutive unique data units in a cSID, and wherein updating the value of the SL field comprises: determining whether the second sub-field comprises a value that is zero; in response to determining that the second sub-field comprises the value that is the zero, replacing the value of the SL field in the received SRH with a new value computed by multiplying the value of the SL field in the received SRH with 128 bits and dividing a respective product by the second number; and in response to determining that the second sub-field comprises the value that is not the zero, decrementing the value of the SL field in the received SRH to indicate the next segment.

Optionally, in any of the preceding aspects, another implementation of the aspect provides that the value of the SL field in the received SRH corresponds to a quantity of remaining segments represented by 128 bits, and wherein the second number used in computing the new value is determined based on the DA of the received IP header.

Optionally, in any of the preceding aspects, another implementation of the aspect provides that, before updating the portion of the DA, in response to determining that the next segment in the order is not a cSID, updating, by the first node, the value of the SL field to indicate the next segment in the order, wherein the updated value of the SL field indicates a quantity of remaining segments in the order that is represented by 128 bits.

Optionally, in any of the preceding aspects, another implementation of the aspect provides that updating the value of the SL field comprises replacing the value of the SL field in the received SRH with a new value computed by multiplying the value of the SL field in the received SRH with the second number, dividing a respective product by 128 bits, and subtracting a respective quotient by one.

Optionally, in any of the preceding aspects, another implementation of the aspect provides that the value of the SL field in the received SRH corresponds to a quantity of remaining segments represented by the second number of data units.

Optionally, in any of the preceding aspects, another implementation of the aspect provides that the SRH further comprises a tag field, wherein the tag field of the SRH comprises a second sub-field for indicating a number of consecutive unique data units in a cSID, and wherein the second number used in computing the new value is determined based on the second sub-field.

Optionally, in any of the preceding aspects, another implementation of the aspect provides that the SRH further comprises a flag field, and a tag field, wherein the flag field of the SRH comprises a first sub-field for indicating a number of common consecutive data units in the group of the SIDs, wherein the tag field of the SRH comprises a second sub-field for indicating a number of consecutive unique data units in a cSID, and the method further comprises in response to determining that the next segment in the order is not a cSID, updating a value of the first sub-field and the second sub-field to zero.

Optionally, in any of the preceding aspects, another implementation of the aspect provides that determining that the next segment in the order is not a cSID comprises determining whether the next segment corresponds to a preset indicator for indicating that all of the cSIDs have been processed, wherein the indicator has a length of the second number of data units.

A third aspect relates to node device, comprising: a receiver configured to receive a packet; a transmitter configured to transmit the packet; a memory coupled to the receiver and the transmitter, the memory storing instructions; and a processor coupled to the memory, the processor configured to execute the instructions to cause the node device to the method in any of the disclosed embodiments.

A fourth aspect relates to a system, comprising: a first node device; and a second node device in communication with the firs node device, wherein the first node device or the second node device includes the node device that performs the method in any of claims 1 to 10 and any of the disclosed embodiments.

A fifth aspect relates to means for forwarding a packet in a segment routing (SR) network domain, comprising: a packet receiving means configured to receive the packet to process the packet; a packet transmission means coupled to the receiving means, the transmission means configured to forward the packet to another node; a storage means coupled to at least one of the receiving means or the transmission means, the storage means configured to store instructions; and a packet processing means coupled to the storage means, the processing means configured to execute the instructions stored in the storage means to perform the method in any of the disclosed embodiments.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
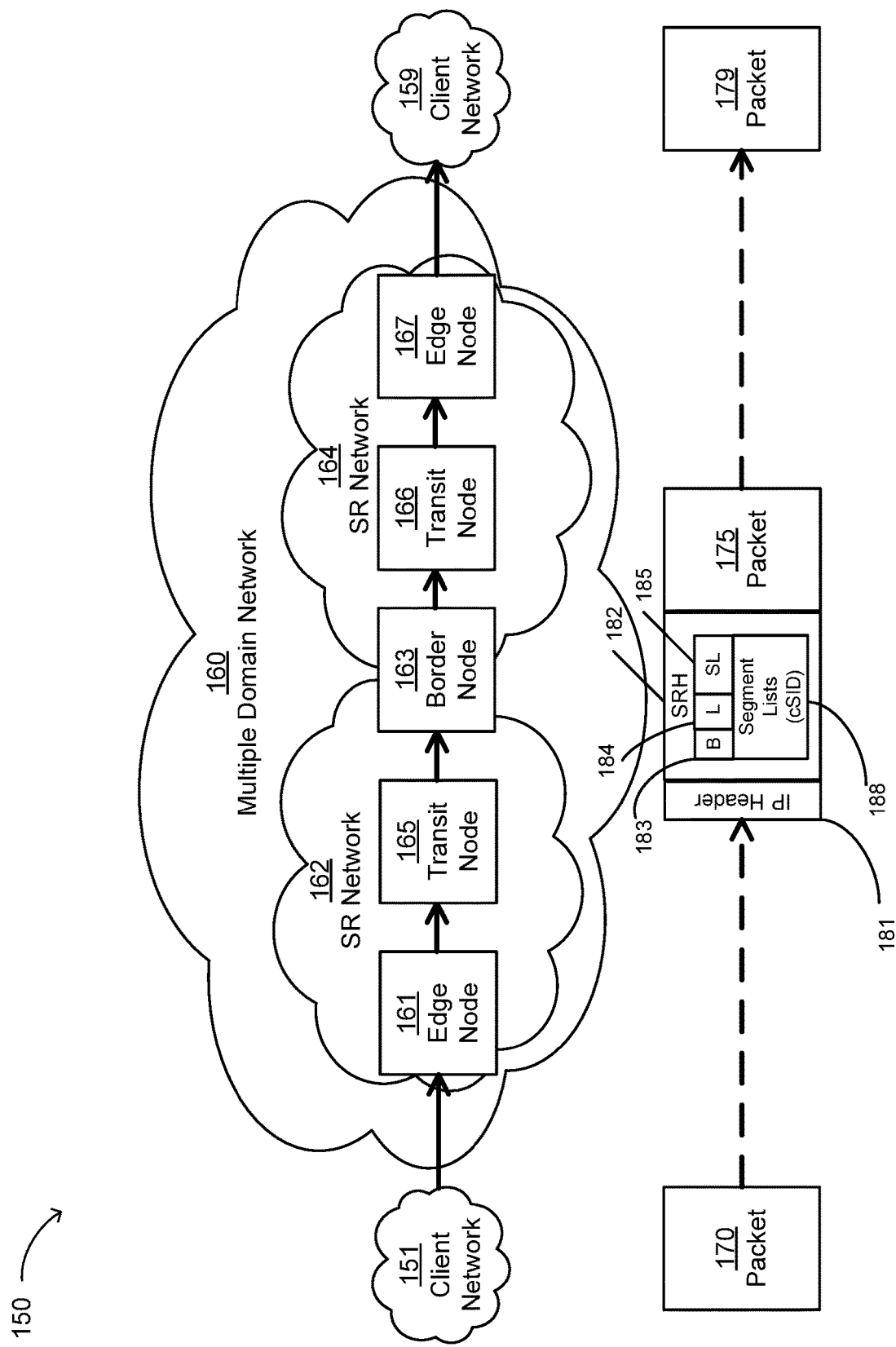
FIG. 1 illustrates a network operating according to one embodiment.

FIG. 1 illustrates a network 150 (e.g., an aggregation of one or more networks of one or more different entities) operating according to one embodiment. As shown, network 150 includes client networks 151 and 159 (which are the same network in one embodiment) communicatively coupled via edge nodes 161 and 167 (acting as an ingress or an egress node) of network 160 that includes multiple, N domains (162, 164) of network nodes, with N being a non-zero integer, interconnected via border node(s) (163). Each of client networks 151 and 159 may include hosts (e.g., end nodes) with upper-layer applications that communicate via network 150. In one embodiment, some of the hosts in client network 151 and/or 159 are Segment Routing-capable in that they can generate and process Segment Routing (SR) packets. The end nodes of the client networks 151 and 159 can transmit a packet (or a native packet) to the edge nodes 161 and 167 of the network 160. The packet can be an Internet Protocol version 4 (IPv4) packet, Internet Protocol version 6 (IPv6) packet, Ethernet frame/packet, or other protocol packet.

In one embodiment, the edge nodes 161 and 167 process packets received from networks 151 and 159, which may include encapsulating or otherwise processing these packets into SR (or SR-MPLS) packets such as by adding a SR header (SRH, sometime also referred to as a segment routing extension header) (and possibly another IP header) to these packets according to a data plane ascertained Segment Routing policy.

In one embodiment, an edge node 161 and 167 or another node within network 160 determines a Segment Routing policy (e.g., a segment list that includes segments that represent IP addresses (e.g., IPv6 addresses)) to apply to packets of a different packet flow. These policies can change in response to network conditions, network programming, etc. In one embodiment, the Segment Routing policy specifies to add one or more SRHs 182, each with one or more segment lists 188, resulting in a Segment Routing packet 175 having one or more SRHs 182. In one embodiment, a native packet 170 is received without an SRH (possibly with an IP Destination Address that is a Segment Identifiers (SID)/IP address of the receiving node 161 or 167), and the receiving node 161 or 167 encapsulates the native packet 170 in an SR packet 175 including one or more added SRHs 182, each including one or more Segment lists 188. The node 161 or 167 also adds an IP header 181 that comprises a destination address (DA) of the packet. In one embodiment, a packet 170 is received with a Segment Routing header (not shown in FIG. 1), and with the receiving node 161 or 167 adding one or more SRHs 182 resulting in a Segment Routing packet including one or more added SRHs 182, each including one or more Segment lists 188. In contrast, and for each of these scenarios, a single SRH 182 could have been used that includes all of the segments in one segment list 188.

An SID (e.g., an SRv6 SID) includes a locator and a function (and optionally, any argument). The locator indicates which node in the multiple domain network 160 a packet 170 is to be routed to in order to perform the function. The function may be any possible function having any optional argument. In an embodiment, a group of SIDs has two common parts—one is the same common prefix of the first B bits; the other is the common function and arguments of the last R bits. The middle L bits of these SRv6 SIDs are different, where L=128−B−R bits. Accordingly, the group of SIDs can be compressed to cSIDs each having L bits of a unique locator. In one embodiment, the segment list 188 of the SRH 182 includes one or more cSIDs.

The SRH 182 also includes multiple fields such as a flag field with a B sub-field 183, a tag field with an L sub-field 184, and a segment left field (SL) 185. In one embodiment, the B sub-field 183 is used to indicate a length of common consecutive data units in the group of SIDs. The L sub-field 184 is defined for a size of a cSID. The SL field 185 is used for a pointer to an active (or next) segment (either a SID or cSID).

After adding the SRH 182 and IP header 181 to the packet 175, the edge nodes 161 and 167 forward the encapsulated packet to transit nodes 165, 166. The transit nodes 165, 166 receive the encapsulated packet 175 and update a destination address (DA) in the IP header 181 based on a cSID in the segment list 188 (by using a value in the SL field 185). Accordingly, the transit nodes 165, 166 forward the encapsulated packet 175 (which includes an updated IP header 181) to the next node (e.g., the border node 163 or edge node 167) in the multiple domain network 160 in accordance with the updated DA. Once the encapsulated packet 175 travels through the multiple domain network 160, the edge nodes 161 and 167 eventually decapsulate or remove an SRH 182 (and possibly the IP header 181) and forwarding the native packet 179 into network 159 or 151.

Disclosed herein are techniques that compress the SRH 182 by compacting the group of SIDs having the common B bits of locator and R bits of function (optionally, arguments) into cSIDs that comprises only the unique L bits of the locator. By compressing the group of SIDs in such a way, forwarding an encapsulated packet reduces network bandwidth and consequently increases packet transmission rate.

Figure 2:
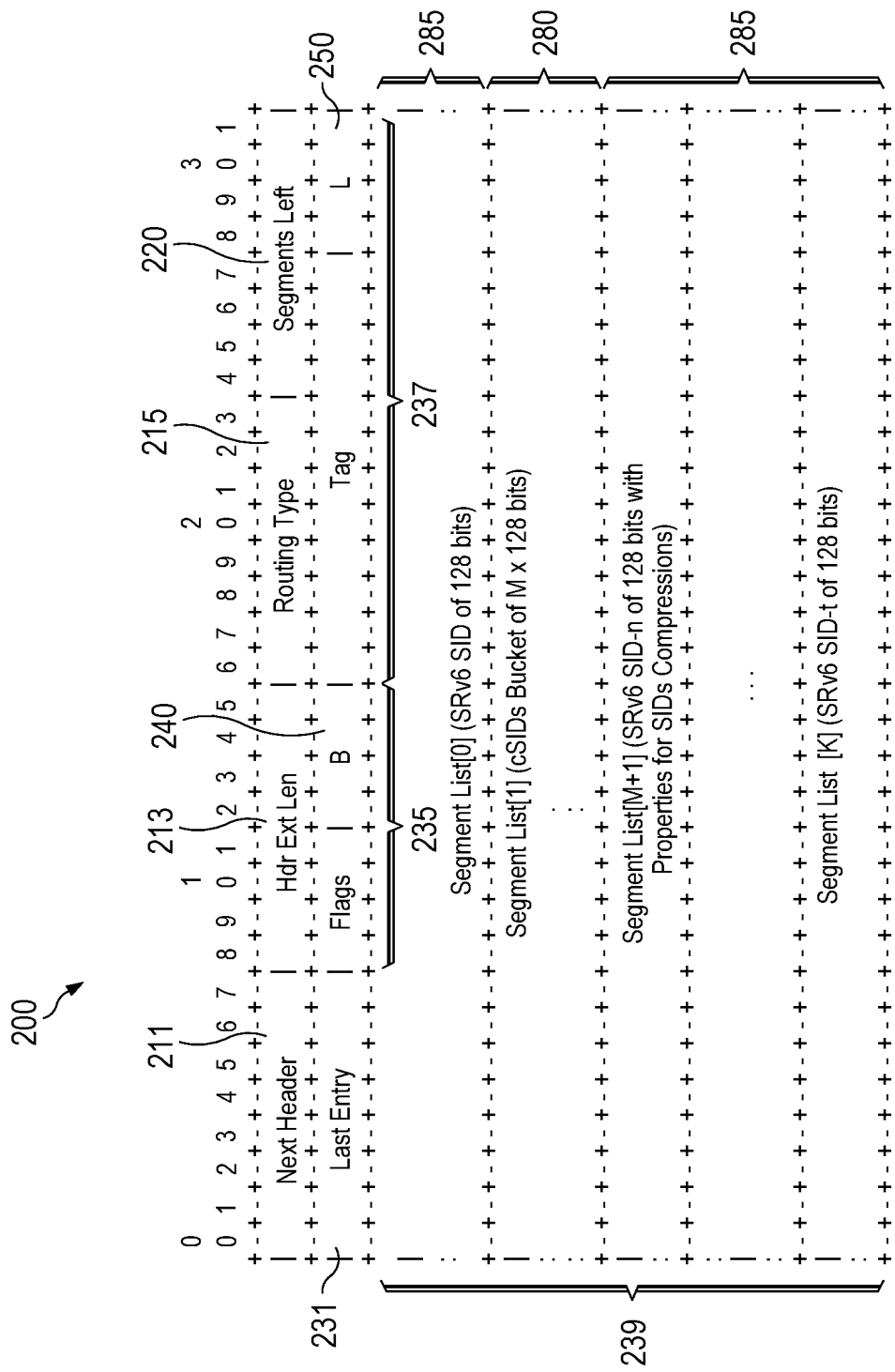
FIG. 2 illustrates a segment routing header (SRH).

FIG. 2 illustrates a segment routing header (SRH) 200. The SHR 200 is similar to the SRH 182 of FIG. 1. As illustrated, the SRH 200 includes a number of fields that increase the size of the data packet. In particular, the SRH 200 comprises a Next Header field 211, Hdr Ext Len field 213, Routing Type field 215, Segment Left (SL) field 220, Last Entry field 231, Flag field 235, Tag field 237, and a list of segments 239.

The Next Header field 211 comprises an 8-bit selector. The Next Header field 211 is used to identify a type of header immediately following the SRH. The Hdr Ext Len field 213 comprises an 8-bit unsigned integer. The Hdr Ext Len field 213 is used to indicate a length of the routing header (RH) in 8-octet units, not including the first 8 octets. The Routing Type field 215 comprises an 8-bit identifier of a particular routing header variant. The SL field 220 comprises an 8-bit unsigned integer. The SL field 220 is used to identify a number of remaining segments in the list of segments 239 before reaching the final destination. The SL value is decremented at each segment. The Last Entry field 231 contains an index of the last element in a segment list.

The Flag field 235 comprises 8 bits of flags. In one embodiment, the Flag field 235 includes a B sub-field 240. The B sub-field 240 is used to indicate a length of common consecutive data units in a group of SIDs. The length can be measured in bytes, nibbles, or bits. In one embodiment, the size of B is 4 bits if using a byte as a data unit, 5 bits if using a nibble as a data unit, and 7 bits if using a bit as a data unit.

The Tag field 237 is used to tag a packet associated with the SRH 200 as part of a class or group of packets. In one embodiment, the Tag field 237 includes an L sub-field 250. The L sub-field 250 is defined for a size of a cSID. In one embodiment, if a size and position of a cSID in the list of segments 239 are in bytes, nibbles, or bits, the size of L sub-field 250 is 4, 5, or 7 bits, respectively.

The list of segments 239 includes one or more segments. The segments are arranged in order that reflects the path of the corresponding packet. Each segment is identifiable by an index of the SL field 220 and has a size of 128 bits or L bits. A segment of 128 bits comprises one SID of 128 bits, or one or more cSIDs of L bits. As shown in FIG. 2, the list of segments 239 can include a bucket (or a group of) cSIDs (i.e., Segment List [1] to [M] 280, where each segment of 128 bits comprises one or more cSIDs of L bits), as well as SIDs (i.e., Segment List [0] and Segment List [M+1] to [K] 285, where each segment of 128 bits comprises one SID of 128 bits). In another embodiment, the list of segments 239 can include only the cSIDs.

Figure 3:
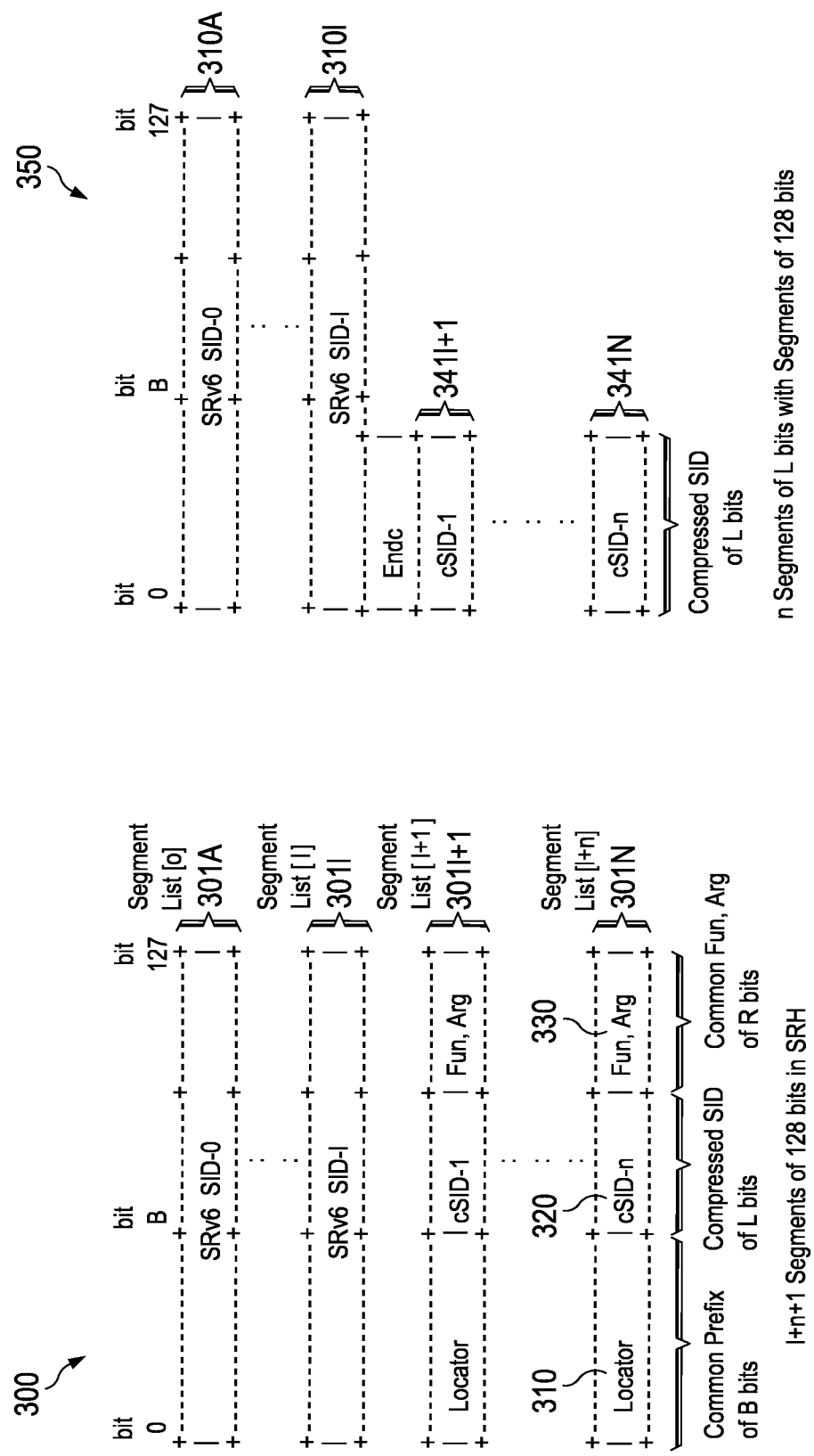
FIG. 3 illustrates a schematic diagram for generating a bucket of compressed segment identifiers (cSIDs) at an ingress node of a segment routing (SR) network domain.

FIG. 3 illustrates a schematic diagram for generating a bucket of compressed segment identifiers (cSIDs) at an ingress node of a segment routing (SR) network domain. Segment routing is defined in more detail in the Internet Engineering Task Force (IETF) draft "SRv6 Network Programming" (https://datatracker.ietf.org/doc/draft-filsfils-spring-srv6-network-programming) by C. Filsfils, et al., published Oct. 7, 2020. This document describes how network instructions (functions) are inserted into an IPv6 packet header using a Segment Routing Header (SRH). By way of example, the 128-bit SRv6 SID (IPv6 Destination Address) is structured as illustrated in FIG. 3. As illustrated in FIG. 3, the SID 301A-301N includes a locator having a common prefix locator 310 and unique suffix (referred to as a cSID) 320. The locator indicates which node a packet is to be routed to in order to perform the function 330. The function 330 may be any possible function having any optional argument. Generally, the length of the SID 301A-301N is fixed.

As shown in FIG. 3, the ingress node can receive a list of segments 300 having (n+1) segments of 128 bits in an SRv6 policy. In an embodiment, the segment list 301A to 301N (including 301I and 301I+1) correspond to the SR version 6 (SRv6) segment identifiers (SIDs) from SRv6 SID-0 to SID-I+n in an SRv6 policy. Each segment 301A to 301N represents an SRv6 SID of 128 bits. The SID contains a locator, function and arguments. Some of these SRv6 SIDs (such as SIDs 301I+1 to 301N) have two common parts—one is the same common prefix of the first B bits; the other is the common function and arguments of the last R bits. The middle L bits of these SIDs 301I+1 to 301N are different, where L=128−B−R bits.

In an embodiment, the ingress node 161, 167 can compress the SIDs 301I+1 to 301N (or remove the common bits B and R) to (n+1) cSIDs 341I+1 to 341N of L bits into a bucket of cSIDs (which will be described in further detail below as bucket 410 in FIG. 4). Accordingly, the list of segments 350 includes SIDs 310A to 310I and cSID 341I+1 to 341N. Each cSID 341I+1-341N would be less than 128 bits. The ingress node 161, 167 can add the list of segments 350 into the SRH 200 instead of the list of segments 300. Accordingly, the ingress node 161, 167 significantly reduces the size of the SRH by (N−I+1)×(B+R) bits.

Figure 4:
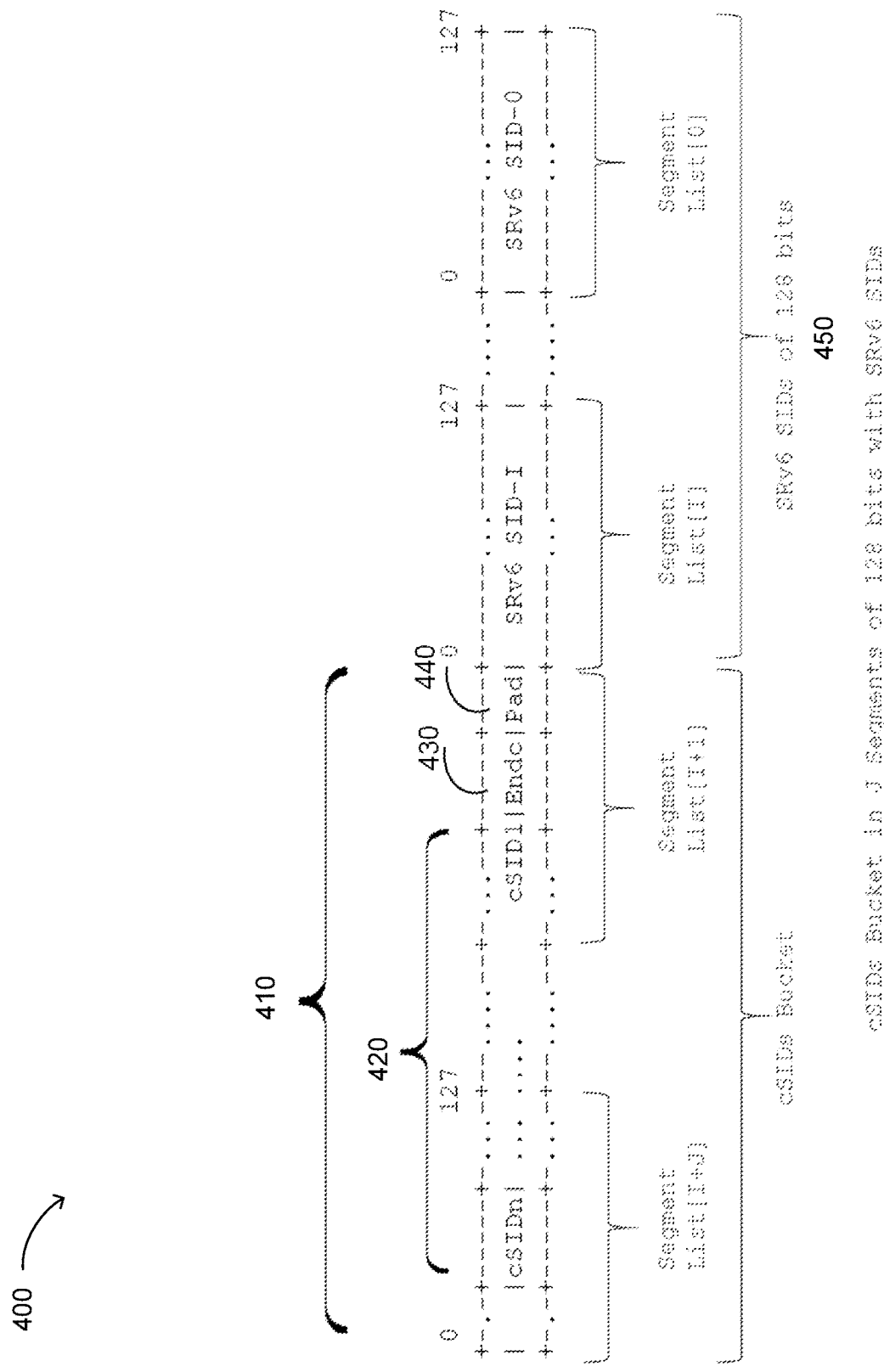
FIG. 4 illustrates a list of segments.

FIG. 4 illustrates a list of segments 400. As shown in FIG. 4, the list of segments 400 includes a bucket of cSIDs (hereinafter, the bucket) 410 and SIDs 450. The bucket 410 contains one or more compressed SIDs (cSIDs) 420. That is, the bucket 410 contains the cSIDs 420 in order within one or more segments of 128 bits. Each cSIDs 420 occupies L bits in a segment or two adjacent segments. At the end of the cSIDs, the bucket 410 contains an End-of-cSIDs (Endc) 430 after the last cSID (e.g., cSID1) for indicating an end of the compression. The Endc 430 has the same length (e.g., L bits) as that of a cSID. In one embodiment, the Endc 430 is all zeros of L bits, which is reserved for Endc 430. In another embodiment, the Endc 430 is all ones of L bits. After the Endc 430, padding 440 can be added in order to make a length of segments comprising SIDs 450 and the padding to be a multiple of L bits. For example, suppose that a remainder (RR) represents the size of SRv6 SIDs from SID-I to SID-0 divided by L as illustrated in FIG. 4. If RR is zero, then there is no padding 440 in the bucket; otherwise (i.e., where RR is not zero), there is a padding 440 of (L−RR) bits in the bucket. Specifically, for (I+1) SRv6 SIDs from SID-I to SID-0, RR=(I+1)*128% L. If RR is zero, there is no padding 440; otherwise, there is a padding 440 of (L−RR) bits in the bucket. In one option, a padding 440 is all zeros of (L−RR) bits.

After adding the padding 440, if there are any empty spaces in the bucket 410 (e.g., space on the left of cSIDn in FIG. 4), secondary padding (not shown) can be added in order to cause spaces leftover (after adding the secondary padding) to be less than L bits. The total number (Ne) of secondary paddings on the right of cSID1 in the bucket 420 is computed by Ne=(J*128−L+RR)/L−(n+1). Similar to the paddings 440, the secondary paddings can be set to all zeros or ones. In an embodiment, the secondary padding can be an extra Endc.

Figure 5:
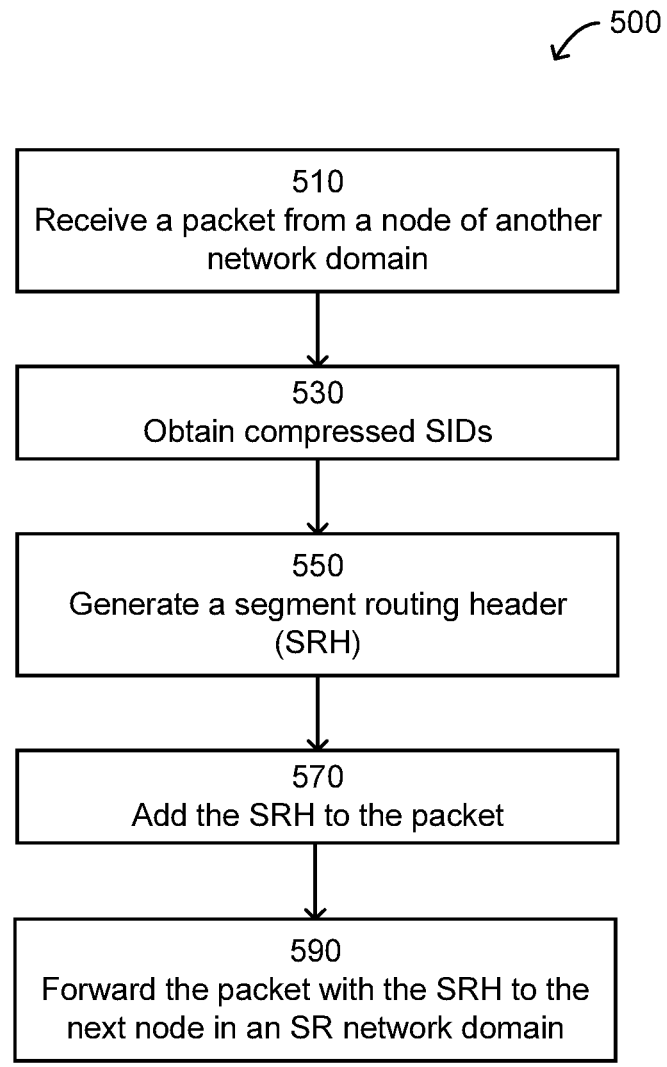
FIG. 5 is an embodiment of a method of forwarding a packet implemented by a node in the SR network domain.

FIG. 5 is an embodiment of a method 500 of forwarding a packet implemented by a node in a segment routing (SR) network domain (e.g., an edge node 161, 167, or a border node 163). The method 500 improves the forwarding process by significantly reducing a size of a segment routing header that is to be attached to the packet. By having such a compact segment routing header, a transmission of the packet requires less network bandwidth and results in an efficient transmission.

In block 510, the node receives a packet from a node of another network domain. The packet is to pass through the SR network domain in accordance with segment identifiers (SIDs). In an embodiment, the node is an ingress node of the SR network domain. In another embodiment, the node is a border node of the SR network domain. The SR network domain is a network domain supporting an SR over Internet Protocol version 6 (SRv6) data plane. An SID has a value of 128 bits. In an embodiment, an SID includes a locator, function, and arguments. When a segment routing policy for an explicit traffic engineering path is applied to steer the packet at an edge node (e.g., the ingress node) of the network domain, SIDs are generated and added to the packet to provide guidance to nodes in the network domain to navigate the packet through the path. In an embodiment, a group (or some) of the SIDs have a number (e.g., B bits) of common consecutive data units (e.g., a byte, nibble, or bit). As illustrated in FIG. 3, a group of SIDs 301A-301N can have a common prefix of B bits in the locator 310. That is, the group of SIDs has a unique suffix (i.e., rest of the locator) of L bits in the locator. Moreover, the group of SIDs can also include R bits of common function and arguments. Accordingly, an SID in the group comprises B bits of the common prefix, L bits of the unique suffix, and R bits of the common function and arguments in order. In an embodiment, the group of SIDs 301A-301N can have at least one of the common function or arguments.

In block 530, the node obtains compressed SIDs (cSIDs) 320 corresponding to the group of the SIDs (that have the common prefix of B bits in the locator). A cSID 320 comprises unique consecutive data units (e.g., bits) of a corresponding SID. For example, a cSID 320 is the unique suffix of the locator 310 having a value of L bits as illustrated in FIG. 3.

In one embodiment, in order to determine the cSIDs, the node generates the SIDs for the packet in accordance with an SR policy of the SR network domain. The node can identify the group of SIDs having the common prefix of B bits in the locator. In an embodiment, the node can identify the group of SIDs based on a binding SID. Once the group of SIDs is determined, the node extracts the unique suffix in a respective SID as a cSID for each SID in the group. In an embodiment, an SID has a size or length of 128 bits. In such a case, a corresponding cSID has a size that is less than 128 bits (e.g., 128 bits minus the B bits of the common prefix and the R bits of the common function and arguments).

In another embodiment, at block 510, the node can receive the cSIDs from another node either in the same or different network domain. As such, in order to determine the cSIDs at block 530, the node extracts the cSIDs from the packet with the cSIDs.

In block 550, the node generates a segment routing header (SRH) 200. In an embodiment, the node creates a SRH 200 (as illustrated in FIG. 2) that has a list of segments (indicated by Segment List [0] to [K] in FIG. 2) and a set of fields such as a segment left (SL) field 220, a flag field 235 with a first sub-field (indicated by a B sub-field 240 in FIG. 2), and a tag field 237 with a second sub-field (indicated by an L sub-field 250 in FIG. 2). In an embodiment, the flag field 235 and tag field 237 do not include any other sub-fields.

After creating the SRH 200, the node generates a list of segments 239. The segment list 239 are arranged in order that reflects the path of the packet. The list of segments 239 includes segments in order. Accordingly, each segment includes one or more cSIDs, such as a part of (e.g., a cSID) or a whole SID. In one embodiment, the node generates a bucket of the cSIDs 410 as shown in FIG. 4. The bucket of the cSIDs 410 includes multiple segments in the order. In an implementation, the node fills in the group of segments with the cSIDs (e.g., 341I+1 to 341N in FIG. 3). Accordingly, most, if not all of the segments in the group are filled with multiple cSIDs. Furthermore, the node inserts an end of compression (Endc) 430 subsequent to the last cSIDs (e.g., cSID1 in the segment labeled Segment List [I+1] in FIG. 4) in the order. The Endc 430 indicates that there are no more cSIDs. The Endc 430 is the same length as a cSID (i.e., the length of the unique suffix in the locator of the group of SIDs). The Endc 430 can be all zeroes or ones depending on a predefined setting.

In an embodiment, the node can append a padding 440 of all zeroes or ones to the Endc 430 in order to make a length of segments comprising SIDs to be a multiple of L bits. In an implementation, the node determines whether a length of the remaining SIDs that are not represented by the cSIDs (or a length of segments including those SIDs) is a multiple of the L. In response to determining that the length of the remaining SIDs is not a multiple of the L, the node determines a quantity (or number) of data units that when added to the length of the remaining SIDs, causes a respective sum to be the multiple of the L. Accordingly, the node generates the list of segments 239 by inserting the cSIDs, the Endc 430, and a primary padding 440 having the quantity of data units into the bucket of the cSIDs 410 and then inserting each of the remaining SIDs 450 into segments 400. On the other hand, the node can determine that the length of the remaining SIDs is a multiple of the L. In such a case, the node does not attach any padding 440 to the Endc 430 in the bucket 410.

Furthermore, the node can add secondary paddings in order to fill in any empty spaces in the bucket so that a length of the left over space is less than the L. In an implementation, the node determines whether the bucket 410 comprises an empty space having a length greater than L. In response to determining that the bucket comprises an empty space having the length greater than the L, the node inserts or attaches one or more secondary paddings into the empty space until the length of the empty space becomes less than the L. Such a secondary padding can be preset to be an Endc 430 or a series of ones or zeroes having a length of L bits.

Once the SRH 200 is created, the node also sets value of various fields in the SRH 200. In one embodiment, the node inserts a value into (or sets a value of) the SL field 220. In one implementation, the node determines a quantity (or a number) of segments in the list of segments 239. Subsequently, the node computes the value of the SL field 220 by multiplying the segment quantity with 128 bits and dividing a respective product by the L. Then, the node sets the SL field 220 to comprise the computed value. In this way, the value of the SL field 220 represents the number of segments in terms of L bits.

In case the list of segments 239 includes at least one SID of 128 bits below of cSIDs (such as SRv6 SID-n to SRv6 SID-t in FIG. 2), the node computes a value of the SL field 220 differently. The value of the SL represents the number of segments of 128 bits. For example, for the segment list in FIG. 2, the value computed for the SL is K, which represents (K+1) segments of 128 bits. In this case, both the B sub-field 240 of the flag field 235 and the L sub-field 250 of the tag field 237 in the SRH 200 are set to zeros.

In addition, the node also inserts a value into the B sub-field 240 of the flag field 235 in the SRH 200. In one embodiment, the node identifies common consecutive data units (e.g., the common prefix of B bits in FIG. 3) in the group of the SIDs. In an implementation, the node determines a common prefix in the locators 310 of the SIDs. The node further determines a size of the common prefix as B bits. Accordingly, the node inserts B into the B sub-field 240 of the flag field 235. For example, when the group of SIDs has 14 bits of common prefix in the locator 310, the node fills in or inserts into the B sub-field 240 a numerical value 14. As such, the B sub-field 240 in the flag field 235 comprises a value of the number of common prefix data units in the locator 310 of the group of SIDs.

Moreover, the node inserts a value into the L sub-field 250 of the tag field 237 in the SRH 200. In an implementation, the node identifies unique consecutive data units (e.g., a compressed SID of L bits in FIG. 3) in an SID of the group of the SIDs. That is, the node determines a unique suffix in the locators of the SIDs of the group. The node then determines a size of the unique suffix as L bits. Accordingly, the node inserts L into the L sub-field 250 of the tag field 237. As an example, when each SID in the group has unique 9 bits at an end of the locator 310, the node inserts a numerical value of 9 into the L sub-field 250. As such, the L sub-field 250 in the tag field 237 comprises a value of the number of unique suffix data units in the locator of the group of SIDs.

In block 570, the node adds or pushes the SRH 182 to the packet 175. In one embodiment, the node also generates an internet protocol (IP) header 181 and adds the IP header 181 as an outer header to the packet 175 with the SRH 182 in such a way to encapsulate both the packet 175 and the SRH 182. In one embodiment, the IP header 181 is an IP version 6 (IPv6) header. In another embodiment, the IP header 181 is an IP version 4 (IPv4) header. The IP header 181 has a destination address (DA) that indicates an address of a node in the SR network domain where the packet 175 is to be passed on next. A node address is represented by an SID. Accordingly, the DA is also composed of the locator, function, and arguments. The node determines an address of the next node in order based on the list of segments 239. The address of the next node corresponds to the next SID in the list of segments 239. The next SID may be represented by the cSID (e.g., 341N). In such a case, the node can construct an SID (e.g., 301N) based on the cSID. That is, the node can prepend the common prefix of the locator to the cSID and append the common function and arguments to the cSID. The node then inserts the constructed address or SID of the next node to the DA. In block 590, the node forwards the packet 175 with the SRH 182 to the next node in the SR network domain. In one embodiment, the packet 175 is forwarded in accordance with the DA in the IP header 181 that is sent with the packet 175.

Figure 6:
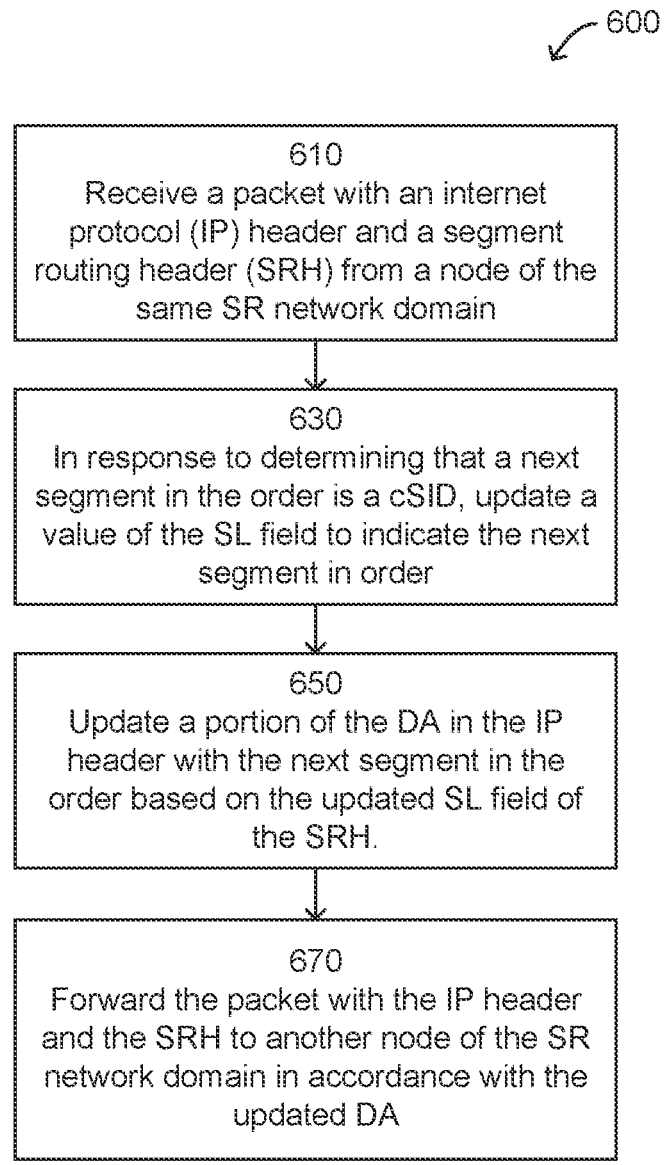
FIG. 6 is another embodiment of a method of forwarding a packet implemented by a node in the SR network domain.

FIG. 6 is another embodiment of a method 600 of forwarding a packet 175 implemented by a node in a segment routing (SR) network domain (e.g., a transit node 165, 166). The method 600 improves the forwarding process by updating only a portion of a destination of the packet as opposed to the entire destination address. Accordingly, the node handles a mass of packets, less processing time and resources are needed.

In block 610, the node receives a packet 175 with an internet protocol (IP) header 181 and a segment routing header (SRH) 182 from another node of the SR network domain. The node is a transit node of the SR network domain. On the other hand, the sending node may be an ingress node, a transit node, or a border node. The SR network domain 162, 164 is a network domain that supports an SR over Internet Protocol version 6 (SRv6) data plane.

The packet 175 is configured to pass through the SR network domain in accordance with segment identifiers (SIDs). Some of the SIDs have a first number of common consecutive data units (e.g., the common prefix of B bits in FIG. 3). The data unit can be a byte, nibble, or bit. As described with respect to FIG. 5 above, when a segment routing policy for an explicit traffic engineering path is applied to steer the packet at an edge node (e.g., the ingress node) of the network domain, SIDs are generated and added to the packet to provide guidance to nodes in the network domain to navigate the packet through the path. In one embodiment, an SID has a value of 128 bits and includes a locator, function, and arguments. In an embodiment, at least some of the SIDs have a number (e.g., B bits) of common consecutive data units (e.g., a byte, nibble, or bit). For example, as illustrated in FIG. 3, a group of SIDs can have a common prefix of B bits and a unique suffix (i.e., rest of the locator) of L bits in the locator. Moreover, the group of SIDs can also include R bits of common function and arguments. Accordingly, an SID in the group comprises B bits of the common prefix, L bits of the unique suffix, and R bits of the common function and arguments in order.

The IP header 181 that is received with the packet 175 has a destination address (DA) that indicates an address of a node in the SR network domain where the packet is to be passed on next. A node address is represented by an SID. In one embodiment, the IP header 181 is an IP version 6 (IPv6) header. In another embodiment, the IP header 181 is an IP version 4 (IPv4) header.

The SRH 200 that is also received with the packet comprises a list of segments 239, a segment left (SL) field 220, a flag field 235, and a tag field 237. The segments are arranged in order that reflects the path of the packet. The list of segments 239 includes segments each comprising a part of or a whole SID. In one embodiment, the list of segments 239 includes a bucket 410 of compressed SIDs (cSIDs) that correspond to the group of the SIDs. The bucket of the cSIDs 410 comprises a group of segments filled with the cSIDs in the order. Each cSID in the bucket comprises unique consecutive data units of a corresponding SID. In one embodiment, a cSID is the unique suffix of the locator having a value of L bits as illustrated in FIG. 3. Furthermore, the cSID bucket includes an end of compression (Endc) 430 subsequent to the last cSIDs in the order. The Endc 430 indicates that there are no more cSIDs. The Endc 430 is the same length as a cSID (i.e., the length of the unique suffix in the locator of the group of SIDs). The Endc 430 can be all zeroes or ones depending on a predefined setting. In an embodiment, the node can add a primary padding 440 of all zeroes or ones to the Endc 430 in order to make a length of segments comprising SIDs to be a multiple of L bits. Furthermore, the node can add secondary paddings in order to fill in any empty spaces in the bucket so that a length of the left over space is less than the L. In addition to the bucket of cSIDs 410, the list of segments 239 can also have one or more SIDs in segments. The SIDs can be placed in front or behind the bucket of cSIDs.

In addition to the list of segments, the SRH 200 also includes a segment left (SL) field 220. As will be described in detail with respect block 630, the SL field 220 represents quantity of remaining segments represented by 128 bits or L bits. In addition to the SL field 220, the SRH 200 also includes the flag field 235. The flag field 235 of the SRH 200 comprises a first sub-field (indicated by a B sub-field 240 in FIG. 2) and a tag field 237 with a second sub-field (indicated by an L sub-field 250 in FIG. 2). The B sub-field 240 of the flag field 235 is for indicating a number of common consecutive data units in the group of SIDs. For example, when the B sub-field 240 comprises a numerical value 14, this means that the group of SIDs has 14 bits of common prefix in the locator. The L sub-field 250 of the tag field 237 is for indicating a number of unique consecutive data units in the group of SIDs, as well as a size of a cSID. As an example, when the L sub-field 250 comprises a numerical value 9, the numerical value indicates that each SID in the group has unique 9 bits at an end of the locator and thus, a size of a cSID is 9 bits.

In block 630, the node, in response to determining that a next segment in the order is a cSID, updates a value of the SL field 220 to indicate the next segment in order. In one embodiment, the updated value of the SL field 220 is equal to a quantity of remaining segments in the order that is represented by the L bits (because the value of the SL field 220 in the received SRH 200 corresponds to a quantity of remaining segments represented by 128 bits). For example, the node determines whether the L sub-field 250 comprises a value that is zero. In response to determining that the L sub-field 250 comprises the value that is zero, the node replaces the value (which corresponds to a quantity of remaining segments represented by 128 bits) of the SL field 220 in the received SRH 200 with a new value computed by multiplying the value of the SL field 220 in the received SRH 200 with 128 bits and dividing a respective product by the L (which is determined based on the DA of the received IP header 181). On the other hand, in response to determining that the L sub-field 220 comprises the value that is not zero, the node decrements the value of the SL field 220 in the received SRH 200 to indicate the next segment (which is cSID).

On the other hand, in response to determining that the next segment in the order is not a cSID (and before updating the portion of the DA), the node updates the value of the SL field 220 (which corresponds to a quantity of remaining segments represented by L bits) in the received SRH 200 to indicate the next segment (i.e., a SID) in the order. The updated value of the SL field 220 should equal to a quantity of remaining segments in the order that is represented by 128 bits. In order to update the value of the SL field 220 so that the updated value indicates the quantity of remaining segments in the order that is represented by 128 bits (because the value of the SL field in the received SRH corresponds to a quantity of remaining segments represented by the L bits), the node replaces the value of the SL field 220 in the received SRH 200 with a new value computed by multiplying the value of the SL field 220 in the received SRH 200 with L (bits) (which is determined based on the L sub-field of the received SRH), dividing a respective product by 128 (bits), and subtracting a respective quotient by one. In addition, the node can further update the value of B sub-field 240 and the L sub-field 250 to zero in response to determining that the next segment in the order is not a cSID. In determining that the next segment in the order is not a cSID, the node can determine whether the next segment corresponds to a preset indicator (e.g., Endc) for indicating that all of the cSIDs have been processed. In one embodiment, the preset indicator has a length of the L bits.

In block 650, the node updates a portion of the DA in the IP header 181 with the next segment in the order based on the updated SL field 220 of the SRH 200. In order to update the portion of the DA, the node identifies the portion of the DA to be updated using the B sub-field 240 and the L sub-field 250 of the SRH 200. In one embodiment, the node determines a starting position of the DA portion based on the value at the B sub-field 240 of the SRH 200 and a length of the DA portion based on the value at the L sub-field 250 of the SRH 200. Then, the node further determines a location of the DA portion based on the starting point and the length. For example, the node can identify a value of 20 bits in the B sub-field 240 and 10 bits in the L sub-field 250, given that the DA is 128 bits long. Accordingly, the node can determine that a portion of the DA from $21^{st}$ bit to $30^{th}$ bit should be updated.

After identifying the portion of the DA to be updated, the node replaces the identified portion of the DA with a segment indicated by the updated SL field 220 of the SRH 200. In case the value of the SL field has been updated to the quantity of remaining segments represented by the L bits, the node replaces the portion of the DA with a cSID indicated by the updated value of the SL field 220. On the other hand, in case the value of the SL field 220 has been updated to the quantity of remaining segments represented by the 128 bits, the node replaces the entire DA with an SID indicated by the updated value of the SL field.

In block 670, after updating the portion of the DA, the node forwards the packet with the IP header 181 and the SRH 182 to another node of the SR network domain 162, 164 in accordance with the updated DA. Accordingly, the packet is forwarded to the next node indicated in the updated DA of the IP header 181.

Figure 7:
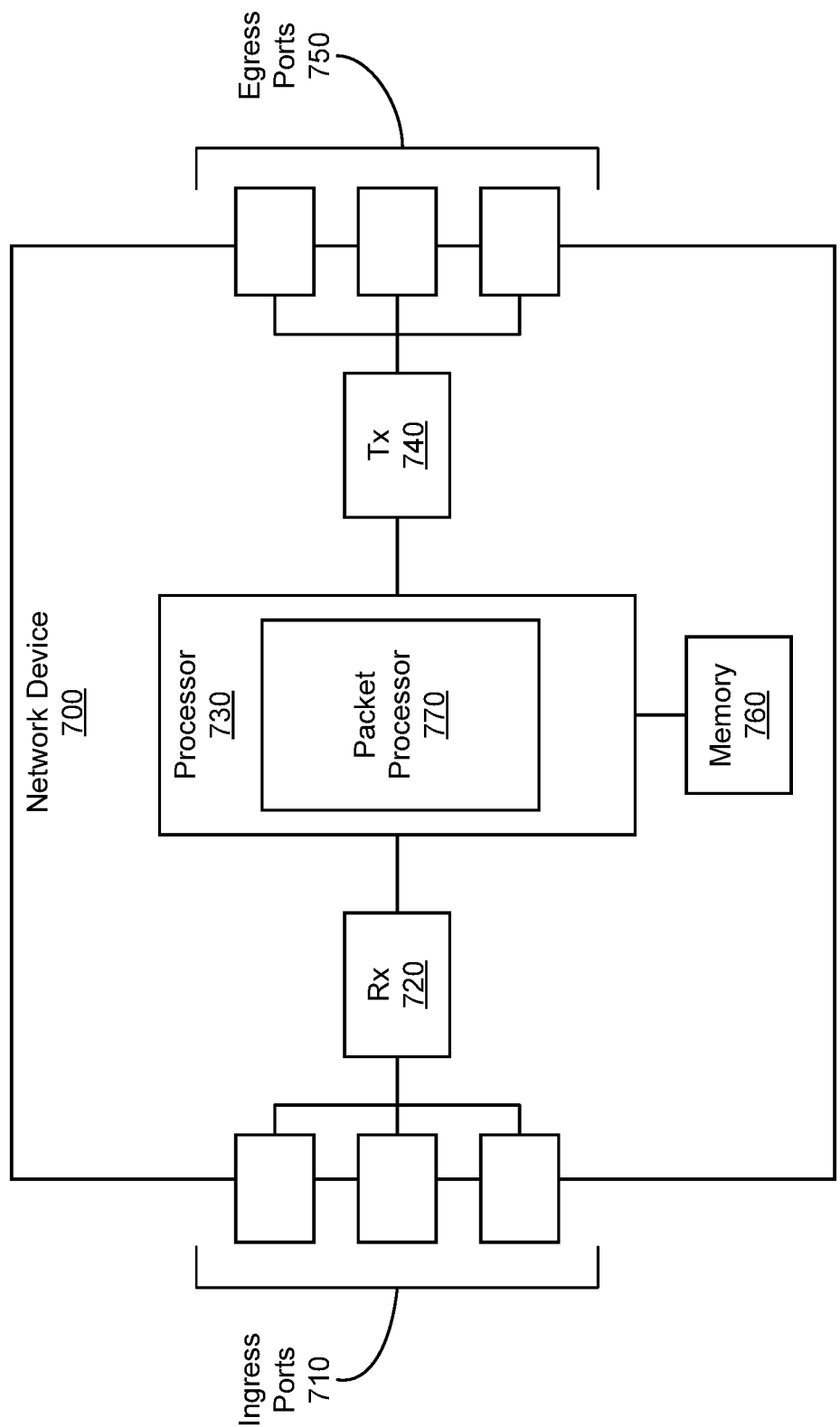
FIG. 7 is a schematic diagram of a node in the SR network domain.

FIG. 7 is a schematic diagram of a node 700 (a.k.a., a network device) in a segment routing (SR) network domain (e.g., an edge node 161, 167, a transit node 165, 166, or a border node 163) according to an embodiment of the disclosure. The node 700 is suitable for implementing the disclosed embodiments as described herein. The node 700 comprises ingress ports 710 and receiver units (Rx) 720 for receiving data; a processor, logic unit, or central processing unit (CPU) 730 to process the data; transmitter units (Tx) 740 and egress ports 750 for transmitting the data; and a memory 760 for storing the data. The node 700 may also comprise optical-to-electrical (OE) components and electrical-to-optical (EO) components coupled to the ingress ports 710, the receiver units 720, the transmitter units 740, and the egress ports 750 for egress or ingress of optical or electrical signals.

The processor 730 is implemented by hardware and software. The processor 730 may be implemented as one or more CPU chips, cores (e.g., as a multi-core processor), field-programmable gate arrays (FPGAs), application specific integrated circuits (ASICs), and digital signal processors (DSPs). The processor 730 is in communication with the ingress ports 710, receiver units 720, transmitter units 740, egress ports 750, and memory 760. The processor 730 comprises a packet processor 770. The packet processor 770 implements the disclosed embodiments described above. For instance, the packet processor 770 implements, generates, processes, prepares, or provides the various packet processing functions. The inclusion of the packet processor 770 therefore provides a substantial improvement to the functionality of the node 700 and effects a transformation of the node 700 to a different state. Alternatively, the packet processor 770 is implemented as instructions stored in the memory 760 and executed by the processor 730.

The memory 760 comprises one or more disks, tape drives, and solid-state drives and may be used as an overflow data storage device, to store programs when such programs are selected for execution, and to store instructions and data that are read during program execution. The memory 760 may be volatile and/or non-volatile and may be read-only memory (ROM), random access memory (RAM), ternary content-addressable memory (TCAM), and/or static random-access memory (SRAM).

Figure 8:
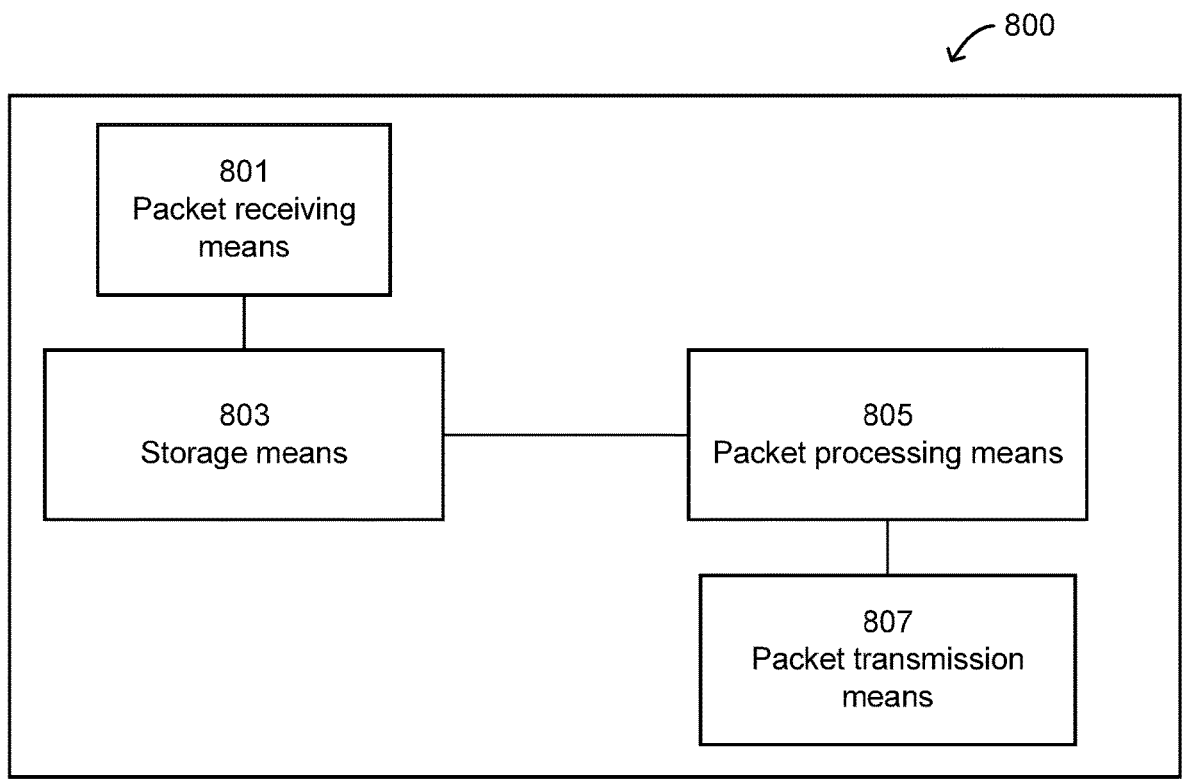
FIG. 8 is a schematic diagram of an embodiment of a means for forwarding a segment in the SR network domain.

FIG. 8 is a schematic diagram of an embodiment of a means for forwarding a packet 800 in a segment routing (SR) network domain. In an embodiment, the capability for forwarding a packet 800 is implemented in a node (e.g., an edge node 161, 167, a transit node 165, 166, or a border node 163). The means for forwarding a packet 800 includes a packet receiving means 801. The packet receiving means 801 is configured to receive a packet (sometimes, an encapsulated packet) from a node. The means for forwarding a packet 800 includes a packet transmission means 807 coupled to the packet receiving means 801. The packet transmission means 807 is configured to transmit the packet to another node.

The means for forwarding a packet 800 includes a packet processing means 805. The packet processing means 805 is coupled to at least one of the packet receiving means 801 or the packet transmission means 807.

The means for forwarding a packet 800 includes a storage means 803. The storage means 803 is coupled to at least one of the packet receiving means 801 or the packet transmission means 807. The storage means 803 is configured to store instructions. The means for forwarding a packet 800 also includes packet processing means 805. The packet processing means 805 is coupled to the storage means 803. The packet processing means 805 is configured to execute the instructions stored in the storage means 803 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a first node in a segment routing (SR) network domain comprising:
   receiving, by the first node from a second node of another network domain, a packet configured to pass through the SR network domain in accordance with segment identifiers (SIDs), wherein a group of the SIDs have a first number of common consecutive data units;
   obtaining, by the first node, compressed SIDs (cSIDs) corresponding to the group of the SIDs, wherein each cSID comprises unique consecutive data units of a corresponding SID, and wherein the unique consecutive data units correspond to a second number of data units;
   generating, by the first node, a segment routing header (SRH) having a list of segments, a segment left (SL) field, a flag field with a first sub-field, and a tag field with a second sub-field, wherein the list of segments comprises segments in order, wherein the SL field comprises a value indicating a quantity of the segments represented by the second number of data units, wherein the segments include the cSIDs and the SIDs that do not belong to the group, wherein the first sub-field indicates the first number, and wherein the second sub-field indicates the second number;
   adding, by the first node, the SRH to the packet; and
   forwarding, by the first node, the packet with the SRH to a third node in the SR network domain.

2. The method of claim 1, wherein generating the SRH comprises:
   in response to determining that a length of the rest of the SIDs is not a multiple of the second number, determining a quantity of data units that when added to the length of the rest of the SIDs, causes a respective sum to be the multiple of the second number; and
   generating the list of segments by inserting the cSIDs and a first padding having the quantity of data units into a bucket that comprises a plurality of segments, and by inserting each SID in the rest of the SIDs into the list.

3. The method of claim 2, wherein generating the SRH further comprises:
   determining a quantity of segments in the list of segments;
   computing the value of the SL field by multiplying the quantity of segments with 128 bits and dividing a respective product by the second number; and
   setting the SL field to comprise the value computed.

4. The method of claim 2, wherein generating the SRH comprises, in response to determining that the bucket comprises an empty space having a length greater than the second number, inserting one or more second paddings into the empty space until the length of the empty space becomes less than the second number.

5. The method of claim 1, wherein obtaining the cSIDs further comprises: generating the SIDs in accordance with an SR policy of the SR network domain; and
   extracting, for each of the at least some of the SIDs, the unique consecutive data units in a respective SID as a cSID.

6. The method of claim 1, wherein receiving the packet comprises receiving the packet with the cSIDs, and wherein obtaining the cSIDs comprises extracting the cSIDs from the packet with the cSIDs.

7. The method of claim 1, wherein the first node is an ingress node or a border node of the SR network domain.

8. The method of claim 1, wherein the SR network domain is a network domain supporting an SR over Internet Protocol version 6 (SRv6) data plane.

9. The method of claim 1, wherein each of the common consecutive data units and each of the unique consecutive data units is one of a byte, nibble, and bit.

10. A method implemented by a first node in a segment routing (SR) network domain comprising:
    receiving, by the first node from a second node of the SR network domain, a packet with an internet protocol (IP) header and a segment routing header (SRH), wherein the packet is configured to pass through the SR network domain in accordance with segment identifiers (SIDs), wherein a group of the SIDs have a first number of common consecutive data units, wherein the IP header includes a destination address (DA) for the packet, wherein the SRH comprises a list of segments, a segment left (SL) field, a flag field, and a tag field, wherein the list of segments comprises segments in order, wherein the segments include compressed SIDs (cSIDs) that correspond to the group of the SIDs and the SIDs that do not belong to the group, wherein each cSID comprises unique consecutive data units of a corresponding SID, wherein the unique consecutive data units correspond to a second number of data units, wherein the flag field of the SRH comprises a first sub-field for indicating the first number, and wherein the tag field of the SRH comprises a second sub-field for indicating the second number;

in response to determining that a next segment in the order is a cSID, updating, by the first node, a value of the SL field to indicate the next segment in the order, wherein the value of the SL field as updated indicates a quantity of remaining segments in the order that is represented by the second number of data units;

updating, by the first node, a portion of the DA in the IP header with the next segment in the order based on the SL field as updated; and forwarding, by the first node, the packet with the IP header and the SRH to a third node of the SR network domain in accordance with the DA updated.

11. The method of claim 10, wherein updating the value of the SL field comprises:

determining whether the second sub-field comprises a value that is zero;

in response to determining that the second sub-field comprises the value that is the zero, replacing the value of the SL field in the SRH received with a new value computed by multiplying the value of the SL field in the SRH received with 128 bits and dividing a respective product by the second number; and in response to determining that the second sub-field comprises the value that is not the zero, decrementing the value of the SL field in the SRH received to indicate the next segment.

12. The method of claim 11, wherein the value of the SL field in the SRH received corresponds to a quantity of remaining segments represented by 128 bits, and wherein the second number used in computing the new value is determined based on the DA of the IP header received.

13. The method of claim 11, wherein the second number used in computing the new value is determined based on the second sub-field.

14. The method of claim 10, further comprising, before updating the portion of the DA, in response to determining that the next segment in the order is not a cSID, updating, by the first node, the value of the SL field to indicate the next segment in the order, wherein the value of the SL field as updated indicates a quantity of remaining segments in the order that is represented by 128 bits.

15. The method of claim 10, wherein updating the value of the SL field comprises replacing the value of the SL field in the SRH received with a new value computed by multiplying the value of the SL field in the SRH received with the second number, dividing a respective product by 128 bits, and subtracting a respective quotient by one.

16. The method of claim 10, wherein the value of the SL field in the SRH received corresponds to a quantity of remaining segments represented by the second number of data units.

17. The method of claim 10, wherein the method further comprises in response to determining that the next segment in the order is not a cSID, updating a value of the first sub-field and the second sub-field to zero.

18. The method of claim 10, wherein determining that the next segment in the order is not a cSID comprises determining whether the next segment corresponds to a preset indicator for indicating that all of the cSIDs have been processed, wherein the indicator has a length of the second number of data units.

19. A first node, comprising:

a memory storing instructions; and a processor coupled to the memory, the processor configured to execute the instructions to cause the first node to:

receive, by the first node from a second node of another network domain, a packet configured to pass through a segment routing (SR) network domain in accordance with segment identifiers (SIDs), wherein a group of the SIDs have a first number of common consecutive data units;

obtain, by the first node, compressed SIDs (cSIDs) corresponding to the group of the SIDs, wherein each cSID comprises unique consecutive data units of a corresponding SID, and wherein the unique consecutive data units correspond to a second number of data units;

generate, by the first node, a segment routing header (SRH) having a list of segments, a segment left (SL) field, a flag field, and a tag field, wherein the list of segments comprises segments in order, wherein the SL field comprises a value indicating a quantity of the segments represented by the second number of data units, wherein the segments include the cSIDs and the SIDs that do not belong to the group, wherein the flag field of the SRH comprises a first sub-field for indicating the first number, and wherein the tag field of the SRH comprises a second sub-field for indicating the second number;

add, by the first node, the SRH to the packet; and forward, by the first node, the packet with the SRH to a third node in the SR network domain.

* * * * *